United States Patent
Burton

(10) Patent No.: US 8,407,598 B2
(45) Date of Patent: Mar. 26, 2013

(54) DYNAMIC WEB CONTROL GENERATION FACILITATOR

(76) Inventor: Ralph Lee Burton, Waller, TX (US)

(*) Notice: Subject to any disclaimer, the term of this patent is extended or adjusted under 35 U.S.C. 154(b) by 280 days.

(21) Appl. No.: 12/964,711

(22) Filed: Dec. 9, 2010

(65) Prior Publication Data

US 2012/0151361 A1    Jun. 14, 2012

Related U.S. Application Data

(60) Provisional application No. 61/267,934, filed on Dec. 9, 2009.

(51) Int. Cl.
   *G06F 15/177* (2006.01)
(52) U.S. Cl. ......... 715/736; 715/760; 709/203; 707/711
(58) Field of Classification Search .................. 715/736, 715/760; 707/711; 709/203
   See application file for complete search history.

(56) References Cited

U.S. PATENT DOCUMENTS

| | | | | |
|---|---|---|---|---|
| 6,954,901 | B1* | 10/2005 | Desai et al. | 715/745 |
| 7,076,786 | B2* | 7/2006 | Burd et al. | 719/316 |
| 8,181,156 | B1* | 5/2012 | Bobykin et al. | 717/120 |
| 2004/0015476 | A1* | 1/2004 | Twaddle | 707/1 |
| 2005/0177586 | A1* | 8/2005 | Chen et al. | 707/100 |
| 2006/0123230 | A1* | 6/2006 | Hewett et al. | 713/164 |
| 2007/0094326 | A1* | 4/2007 | Gupta et al. | 709/203 |
| 2008/0065769 | A1* | 3/2008 | Curtis et al. | 709/226 |
| 2008/0104255 | A1* | 5/2008 | Volodarsky et al. | 709/228 |
| 2009/0259945 | A1* | 10/2009 | De Spiegeleer | 715/744 |
| 2012/0096048 | A1* | 4/2012 | Patch et al. | 707/803 |

\* cited by examiner

*Primary Examiner* — Tuyetlien Tran
(74) *Attorney, Agent, or Firm* — Delphine James

(57) ABSTRACT

This invention provides a method, system, and apparatus for generating and manipulating the structure of user interface control hierarchies. When a web page is requested from a server by client software an initial control hierarchy configuration is generated. Upon successive requests by the client to the server, the structure of the web control hierarchy generated for the given web page may be altered, as prescribed by the specifications. The nature of those alterations can include the addition or replacement of web control sub-structures. This invention can be utilized to manipulate dynamic control hierarchies generated within a statically-generated hierarchy.

12 Claims, 14 Drawing Sheets

DYNAMIC WEB CONTROL GENERATION FACILITATOR

Non-provisional application Ser. No. 12/964,711 claims the filing date of provisional application 61/267934 filed Dec. 9, 2009.

TECHNICAL FIELD OF INVENTION

This invention relates to software application development. More specifically, this invention relates to the generation and manipulation of dynamic web pages.

BACKGROUND OF THE INVENTION

The Internet, also known as the World Wide Web ("Web"), is a global computer network. The Web has become a marketplace for many companies to sell products or services. It also provides a means by which schools and government organizations can post information on a web site to make it available to the general public. The web applications that provide this functionality are generally implemented utilizing the client/server architecture. The client component of the application is typically optimized for user interaction, and the server component provides a centralized means for multiple users to access the functionality of the web application.

A Web Browser is software that operates on a client computer. It provides the functionality that a user would require to locate and access information on remote computers that function as Web servers. Web browser software acts as the client component, providing a user interface to the internet (or intranet). Utilizing TCP/IP protocols, the browser sends requests to remote web servers for web pages to be viewed and interacted with on the client computer. Examples of web browsers are Netscape, Mozilla, Internet Explorer, Firefox, and Mosaic.

A Web Site is a file (or a set of files) containing information, located on a web server, connected to the web. The file(s) that comprise a web site can contain web pages, which may include text, photographs, illustrations, video, music, or computer programs. The content of web pages is normally written in EXtensible HyperText Markup Language (XHTML), which are documents containing two parts: (1) content and (2) markup tags. Content is the part of the document meant to be rendered on a computer screen. Markup (or tags) is encoded information that affects the formatting and display of text and images on the screen. The web page is typically rendered in compliance with the W3C Document Object Model (DOM), which is a platform and language-neutral interface that allows programs and scripts to dynamically access and update the content, structure, and style of a document. Every XHTML element is arranged in a hierarchy within the DOM, with the "DOCUMENT" element being the top node within the hierarchy.

Web sites can contain static or dynamic web pages. With static web pages, the content is fixed and cannot change. When web navigation provides an interactive experience, it is called dynamic. With dynamic web pages, the content and design is usually segregated. The content is typically stored within a database that is placed on a web page only when necessary, as the dynamic aspect of the web page would typically adjust and react to the data rendered to the web page, depending upon the form and content of the data being accessed. The primary benefit of this software facility is that it simplifies and systematizes the development of dynamic applications in the course of implementing the functionality defined within the specifications for the application being developed.

Interactivity on web pages can be created using client-side scripting or server-side scripting. Client-side scripting, such as Javascript, or DHTML, can be used to change behavior within a webpage on the client computer. Server-side scripting, such as ASP.NET, Java, PHP, Perl, or ColdFusion, is used to change the supplied page source between pages. With client-side scripting, the content (and sometimes the structure of the DOM hierarchy) is manipulated on the client's computer. The web browser retrieves a page from the server, then processes the code embedded within the retrieved web page, which affects the manner in which the content is presented to the user. With server-side scripting, the client computer sends a web page request to the server utilizing the web browser. When the server receives a request, the server processes the server-side script based upon the request from the client computer, and sends the processed page back to the web browser for display and user input. Client-side scripting and server-side scripting can be used simultaneously to create dynamic web pages.

Web controls are the objects that are rendered, by the server, into XHTML software elements that are, in turn, rendered onto the webpage by the web browser. These are the basic elements that can be utilized as the interface points between the client and the server, for the particular data elements being accessed and modified (if necessary).

In the prior art, there are several conventional server scripting tools used to generate dynamic web pages. However, the present invention provides a novel method and system to facilitate the generation and manipulation of dynamic web control structures and sub-structures, and integrate them into dynamic web pages.

SUMMARY

This system will be referred to as "DYNASTRUGEN" within the context of this document.

One of the major advantages of this system (invention) is that it provides a high degree of interoperability amongst web controls that are required to interact with each other in a prescribed manner. In that sense, derived (enhanced) web controls, as well as the methods that generate the web controls, can assume operational roles, and participate with other web controls (and\or other web control generation methods) within the context of a given logical mechanism, as they perform operations such as implanting derived (enhanced) web control objects within internal data structures, and cross-linking web controls in terms of referencing each other (for purposes such as input validation and error message display).

Another advantage of this system (invention) is to provide an efficient and simplified mechanism for manipulating the content and structure of web pages. Web control sub-structures can be added, removed, or switched with alternate sub-structures within a web page in response to user interaction and/or data input (or any other event that might be triggered in the course of the functioning of the software application), as required to do so within the specifications for the application. This system (invention) facilitates this functionality by providing a framework within which a software developer configures it to perform as required within those specifications. For every web control object to be created (instantiated), there must be a method to create it. A software developer writes software code to create methods that will generate those web control objects, unless there are methods already written within a pre-existing library of methods from which the developer can appropriate. If any new methods are written, the developer must then create or alter software code to add the references (or virtual function pointers) for those methods to a vector table of references for all of the methods being utilized within the framework to generate web control objects. The software developer would then associate unique integer-valued codes with each of those elements within that vector table (optionally through the usage of enumerated lists), as they would be indexing references (or offsets from the base address of that vector table) for those referencing elements. The software developer would then create associations between lists of those unique integer-valued codes with the control container for which the web control objects instantiated by those (associated) methods would be intended, utilizing a unique identifying attribute for those control containers (such as an ID string). After those initialization operations have been performed, a call to a system Application Program Interface (API) method which implements an engine that utilizes those lists of unique integer-valued codes to generate a structure of web control objects would complete the process of generating a web control hierarchy dynamically. To alter the web control hierarchy, a software developer utilizing this system (invention) would then write software code to create handlers that would react and respond to inputs to the system, then call the appropriate system Application Program Interface (API) methods that can alter the web control hierarchy in the desired manner (as specified within the specifications for the application being developed).

Definitions and System Overview

The present invention provides a system and method to facilitate the dynamic generation and manipulation of user interface control hierarchies, which includes internet, intranet, and desk top applications. In terms of application, it is a "system for constructing systems". This invention does not supplant the conventional method(s) of generating web pages, but augments it, as it can be integrated into the rendered web page with the utilization of a root container control object (or "anchor") that can be instantiated by a static tag entity within the web page, or by utilizing other approaches to implant a root container control within the web control hierarchy with which dynamically-generated web control hierarchies (or "sub-hierarchies") can be generated utilizing the Dynastrugen system. Within any given web page, there can be multiple root container control objects, as there can be multiple instances of the API objects active simultaneously, which would imply that a theoretically infinite number of dynamic hierarchies can co-exist (and co-function either sequentially or concurrently) within the execution domain of any given web page.

For a particular web page, a developer-defined data structure is created to define an execution map for the web control hierarchy, which is essentially the "blueprint map" for the dynamic hierarchy to be generated. The data structure defined by the developer can take the form of a one-dimensional table structure, such as a hash table, residing within a session cache that is uniquely associated with a given user/client to the system. The data structure can also take the form of an integer-indexed, two-dimensional jagged array, as the first index would be uniquely associated with a particular node (which would be a control container) within the dynamically-generated web control hierarchy. In any form, there will be a list of integer-type INDEXING CONTROL CODES (ICC's) uniquely associated with every control container within a generated web control hierarchy. Each ICC will relate to and reference the web control object to be generated and inserted into that particular control container. This is the core element for the proper functioning of Dynastrugen.

Web control objects are instantiated within the operational software code running on the server. A web control object is a data structure that can contain methods which provide the interfacing necessary to facilitate the operational purpose of the web control to be rendered to the web page. A web control object can also contain properties, which control how the web control is rendered, and how the web control will behave upon rendering. Upon submission to the scripting server, web control objects can be rendered into scripts that will be, in turn, rendered into objects within the Document Object Model (DOM), which are instantiated within the operational domain of a client web browser. The objects within the Document Object Model will be referred to as DOM OBJECTS within the context of this document. DOM Objects are instantiated in the process of rendering XHTML code within the (usually interactive) window area of a client web browser, along with the data content requested from the server, as received from the server upon response to a request. DOM Objects can take the form of textboxes, labels, buttons, check boxes, list boxes, and other types of objects that are typically rendered by a web browser to facilitate user interaction.

A web control object that acts as a container for other web control objects will be referred to as a CONTROL CONTAINER within this document. A control container is a data structure with properties and methods (much like a web control object), but also retains (as a property) a list of references to the web control objects that it is intended to contain. Control containers can also contain other control containers (as a control container is a type of web control object), which is a means by which hierarchical relationships can be established within a web control hierarchy.

In the process of establishing the functional aspects (components) of Dynastrugen, a developer writes software code to create methods that will instantiate web control objects, with a different method being created for each variation of a particular web control object (if that method has not already been created for a previously-developed hierarchy). Those methods will be referred to as WEB CONTROL GENERATION METHODS (WCGM's) within this document. The web control objects instantiated by the WCGM's are rendered by the scripting server into XHTML code, along with the content to be accessed by the user/client, as they are provided to the web browser upon response to a request to the server.

In the process of establishing the functional aspects (components) of Dynastrugen, a developer writes software code that will assign a virtual function pointer for each and every WEB CONTROL GENERATION METHOD (WCGM) to a vector table (or "array"). That vector table will be referred to as the WEB CONTROL GENERATION METHOD VECTOR TABLE (WCGMVT) within this document. Please refer to FIG. 5 for a representation of that structure.

The WEB CONTROL GENERATION METHODS (WCGM's) will be called by referencing the corresponding virtual function pointers within the WEB CONTROL GENERATION METHOD VECTOR TABLE (WCGMVT), utilizing integer-valued indices. As mentioned before within this document, those integer-valued indices will be referred to as INDEXING CONTROL CODES (ICC's).

In the course of dynamically generating a web control hierarchy, lists of INDEXING CONTROL CODES (ICC's) will be provided to an Application Program Interface (API) method that will execute the operation of generating that hierarchy. The API method that implements this functionality will be referred to as the CONTROL HIERARCHY GENERATION ENGINE (CHarGE) within this document.

The CHarGE will utilize the lists of integer-valued ICC's to reference particular virtual function pointers within the WCGMVT, which will be utilized to call the corresponding WCGM's that will generate the web control objects intended for the control container that is currently on top of the stack of references for control containers. The object that maintains that stack will be referred to as the CONTROL CONTAINER REFERENCE STACK FACILITATOR (CCRSF) within this document.

In the process of establishing the functional aspects (components) of Dynastrugen, a developer creates a web page in the conventional way that web pages are typically created, including a form area for rendered content. Within that form area, a web control object is inserted to instantiate a control container, usually by editing the code for the web page to insert a script server tag element into the form area. A reference to that control container object is the first array element that will be placed upon the CONTROL CONTAINER REFERENCE STACK (CCRS), as maintained by the CONTROL CONTAINER REFERENCE STACK FACILITATOR (CCRSF). That web control object will be referred to as the ROOT CONTROL CONTAINER (RCC) within this document. Optionally, a reference to the form element itself can be placed as the first element upon that stack, establishing it as the RCC. At this point, it should be noted that multiple ROOT CONTROL CONTAINERS (RCC's) can be established upon any given web page, with multiple instances of the Dynastrugen system running, either sequentially or concurrently, within the execution context for the web page.

The association between the lists of INDEXING CONTROL CODES (ICC's) with the respective control container for which the web controls being generated are intended is made utilizing a unique identifying attribute for the control container, as that attribute must be unique within the context of the web page being rendered. In one embodiment of the present invention, the string associated with the ID attribute for the control container will be utilized as the key to insert (then later retrieve) the list of ICC's associated with that control container into a hash table data structure. The hash table data structure is created within the session cache uniquely associated with the user/client accessing the system. It is with the unique identifying attribute for each control container that the CONTROL HIERARCHY GENERATION ENGINE (CHarGE) will retrieve the list of ICC's that will be utilized to generate the web control objects intended for the control container that is being referenced by the pointer that is currently on top of the CONTROL CONTAINER REFERENCE STACK (CCRS), as maintained by the CONTROL CONTAINER REFERENCE STACK FACILITATOR (CCRSF). It is with these lists of ICC's that the CHarGE will call each Web Control Generation Method (WCGMVT) in the order that the web control objects generated by those methods are to be inserted into the control container that is being referenced by the top pointer on the CCRS. In performing this operation, the CHarGE will apply each ICC to the Web Control Generation Method Vector Table (WCGMVT) to call the WCGM that the ICC is associated with. These are the fundamental elements that comprise what is referred to as a BLUEPRINT MAP within this document. The operations performed here are fundamental to the operation of the Dynastrugen system as a whole. Please refer to FIG. 4 for an example representation of a BLUEPRINT MAP.

The ID string assigned to any and all web control objects (including control containers) is a composite consisting of the ID string of the containing (parent) control container, and a string representation of the ordinal integer value for the position of the INDEXING CONTROL CODE (ICC) within the list of ICC's associated with the control container into which the instantiated web control object will be inserted, along with a separator character inserted within the composite in order to avoid any ambiguities. In addition, the instance count for the web page being requested is also made a part of the (composite) ID string, as there can be more than one instance of the web page being accessed by a given user, with more than one blueprint map being utilized (one for each instance of the web page being accessed).

Based upon the active blueprint map, the system generates a web control hierarchy that is provided as input to a server side scripting language environment, such as ASP.NET, Java, PHP, ColdFusion, or Perl. In the aftermath of the initial generation, a set of system Application Program Interface methods (API's) can then be used to add additional web control sub-structures to the primary (active) structure, or to change sub-structures with other defined (alternate) sub-structures, as they are defined and loaded into memory, external to and apart from the active blueprint map.

As mentioned before within this document, in the process of establishing the functional aspects (components) of Dynastrugen, a developer creates a BLUEPRINT MAP that will be utilized to instantiate web control objects, then those objects are inserted into the control containers for which they are intended. This is accomplished by inserting lists of INDEXING CONTROL CODES (ICC's) into a table created within the session cache, creating an association between each list inserted with the control container into which the instantiated web control objects are to be inserted once the ICC's are utilized to generate a dynamic hierarchy. The developer utilizing this system (invention) can write computer code that will load any and all blueprint maps directly into the table created within the session cache that will be utilized to retain it (from one page request to another), or (alternatively) by utilizing the integral XML parser that processes a mark-up language that defines the structures and sub-structures to be generated, including any and all alternate sub-structures that would be used in the process of changing the web page (in terms of both content and structure). That mark-up language will be referred to as DYNASTRUGEN STRUCTURE DEFINITION MARK-UP LANGUAGE (DSDML) within the context of this document.

DETAILED DESCRIPTION

Figure 1:
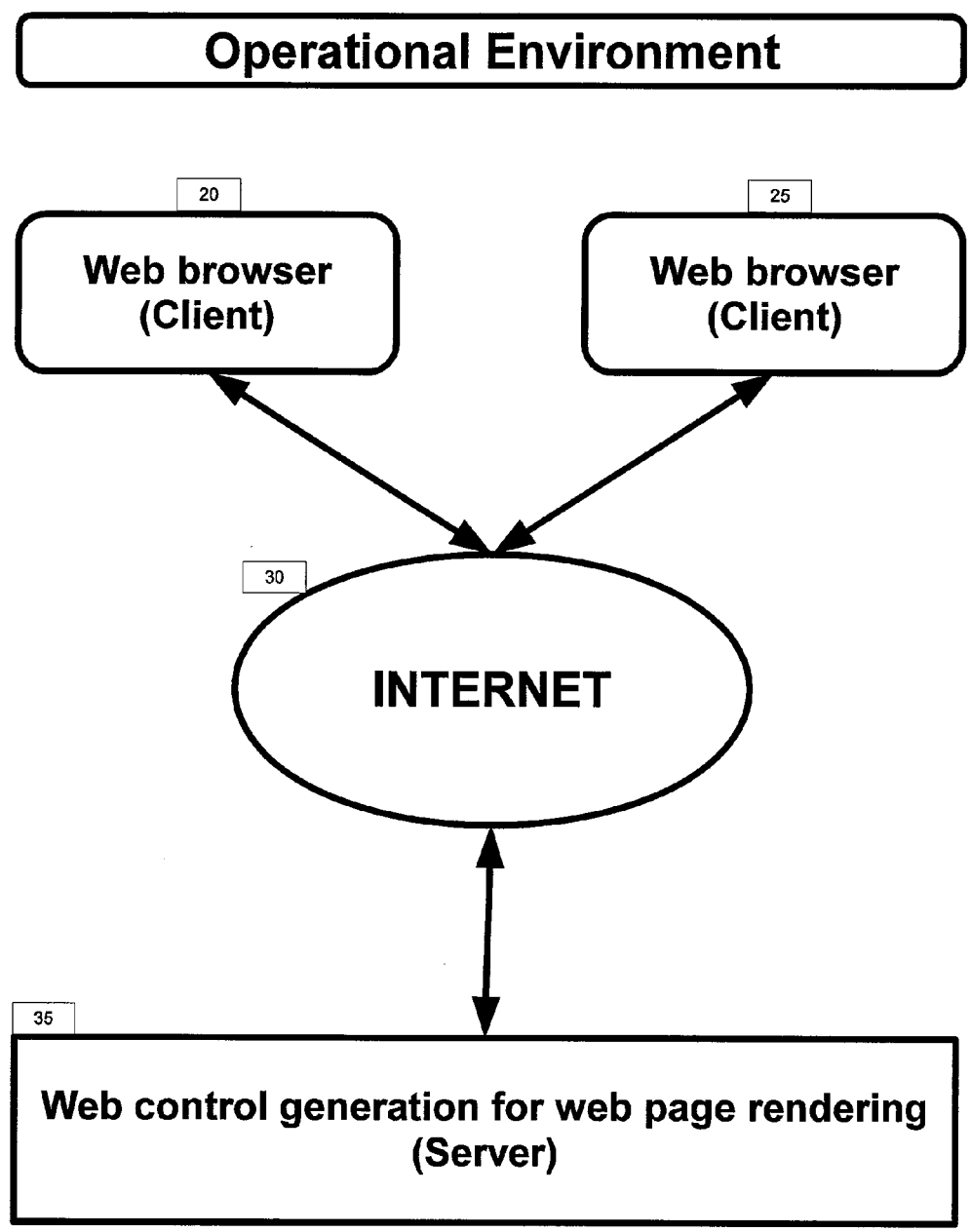
FIG. 1 illustrates the software architecture of the present invention.

FIG. 1 illustrates the software architecture used to support the implementation of this system in a client/server environment. In the preferred embodiment of the present invention, ASP.NET is used as the basic foundation for implementation and operation. However, other server side scripting languages can be utilized. ASP.NET was utilized because it provides the best selection of programming elements to support the functionality of this system.

Web control objects are rendered by the server and client into DOM Objects that predominately control the user interface (i.e.: text boxes, list boxes, and labels). The scripting server renders them into XHTML, along with the requested data content to be accessed, which is then rendered into DOM Objects by the web browser upon receiving the response to the request made for the web page.

The present invention is generally implemented in a client-server architecture as disclosed in FIG. 1, but can also be utilized in the development and implementation of stand-alone (desktop) applications. Web browsers 20 and 25 allow a user to interface with a web server 35 utilizing the internet 30. The web browser requests a web page from a web server 35. Dynastrugen, as utilized within the web application on the server via the provided API, intercepts the request and generates a structure of web control objects utilizing a developer-defined blueprint map. The structure of web control objects is then passed to the rendering engine (such as ASP.NET, PHP, Java, ColdFusion, or Perl), which ultimately renders all of the elements that will be utilized by the browser to generate the web page, typically in the form of XHTML, along with the content being accessed by the client/user.

The present invention dynamically generates web controls to be rendered within the window area of a web browser on a client computer as depicted in FIG. 1. It also facilitates the manipulation of the generated hierarchy on successive request/response events, using event handlers that call system API methods that provide the required functionality to alter the web page, to which references are passed for sub-structures defined within the table data structure established within session cache.

Figure 2:
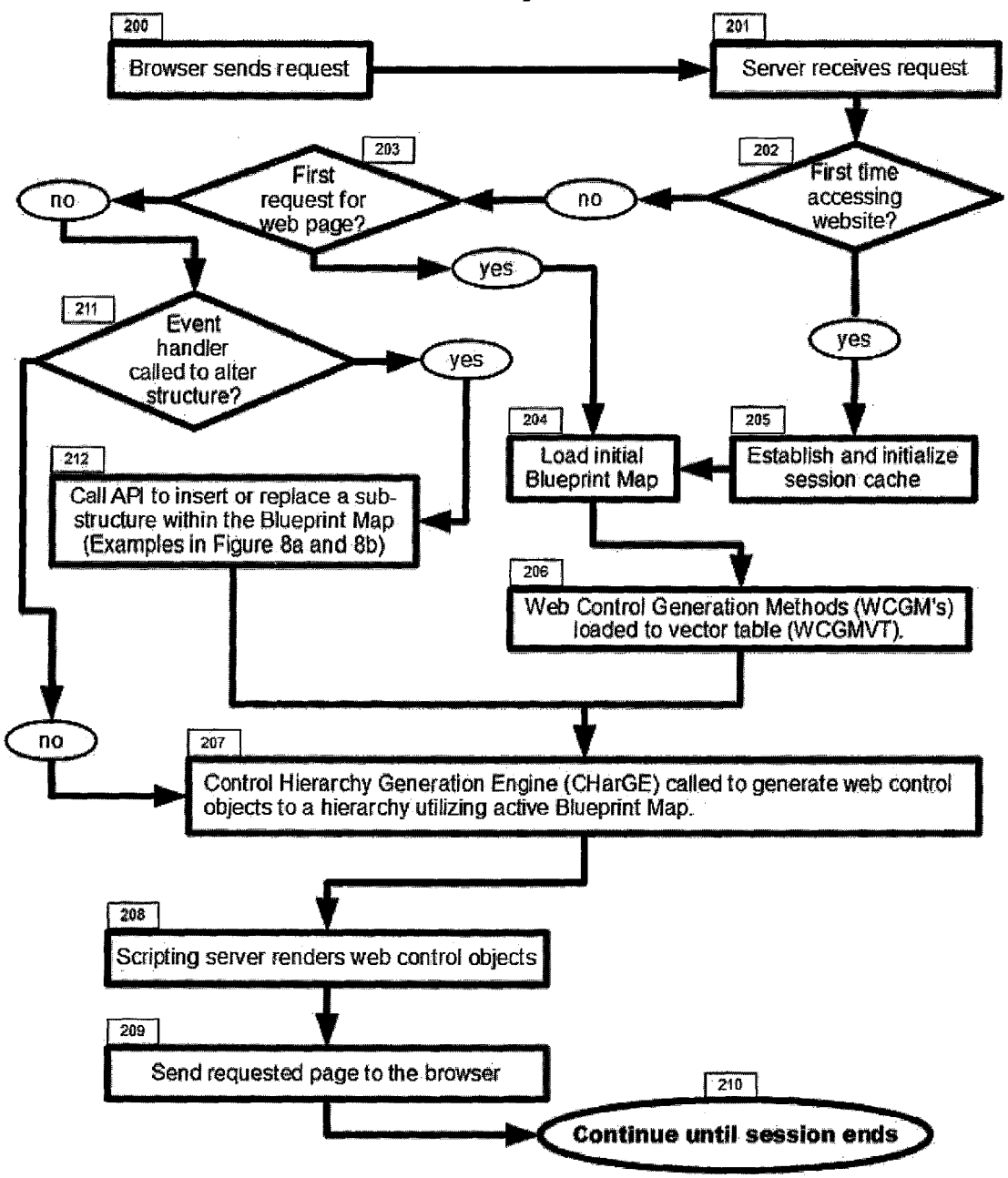
FIG. 2 illustrates a functional block diagram of the present invention.

FIG. 2 illustrates the implementation of this present invention within the ASP.NET environment. ASP websites are enabled utilizing common related group of objects: REQUEST, RESPONSE, SERVER and SESSION. Normally, when the web browser requests an ASP.NET file, the Microsoft Framework passes the request to the ASP.NET engine that reads the file, line-by-line, and executes the scripts in the file. After the execution of the scripts, the web page is sent to the browser as XHTML. However, with the present invention, Dynastrugen (201) intercepts the webpage request and executes as described below, then passes control back to the script server to render the web page, as it normally does within the page life cycle.

Figure 8A:
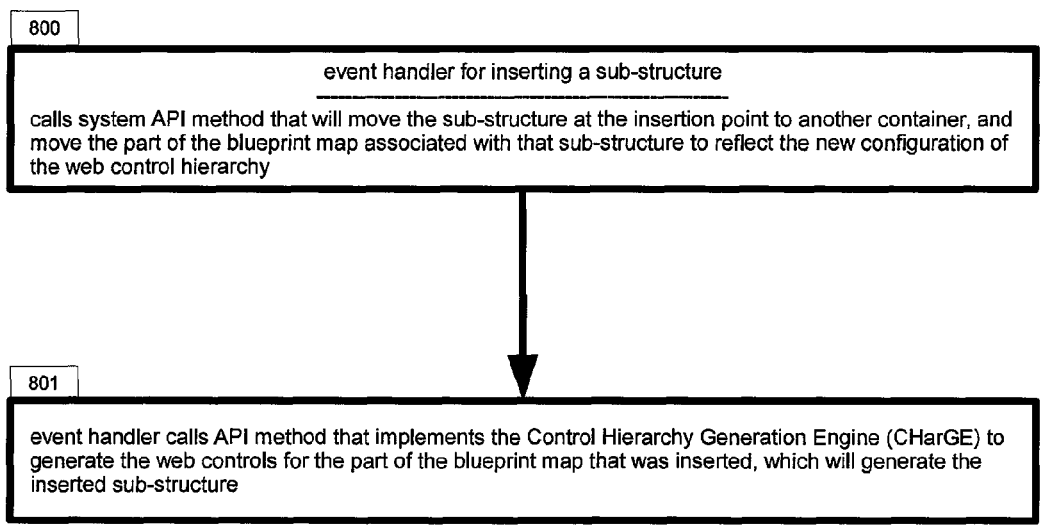
FIG. 8a is a flow chart of the event handler for inserting a sub-structure
Figure 8B:
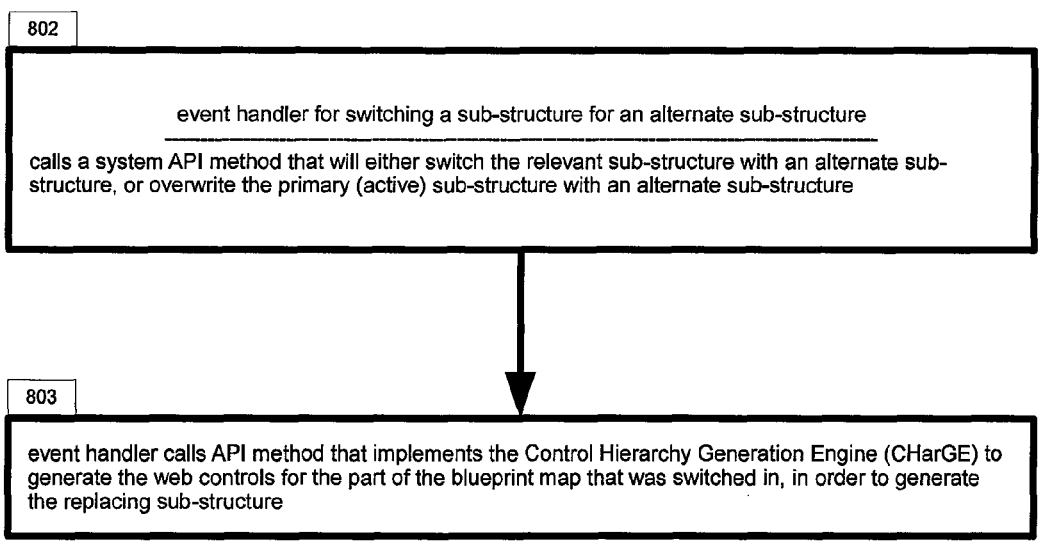
FIG. 8b is a flow chart of the event handler for substituting alternate sub-structures.

At step 202 the system determines if the client is requesting access to the website for the first time. If so, at step 205, a session cache is allocated for the user/client as a repository for the variables uniquely associated with the particular user/client, Then at step 204, the initial blueprint map is loaded for the web page requested. At step 211, the system calls the event handler to alter structure. At step 212, the system calls an API to insert or replace the sub-structure into the blue print map as shown in FIGS. 8a and 8b.

At step 203, the system determines if the client is accessing a particular web page for the first time. If so, the system proceeds to step 204 to load the initial blueprint map for the web page requested.

At step 206, each and every variation of the web control objects that the server-side scripting engine will utilize to generate the web page will be generated by Web Control Generation Methods (WCGM's). A reference (or virtual function pointer) to each of those Web Control Generation Methods (WCGM's) will be loaded into a Web Control Generation Method Vector Table (WCGMVT).

At step 207, the web control generation engine (CharGE) will utilize the WCGMVT in the execution of the WCGM's.

At step 208, the scripting server will render the web control objects for the requested web page, and the requested web page will then be sent to the client (browser) at step 209.

Before the system can be utilized, it must be initialized and configured. This is an activity that is typically performed by an application developer in accordance with the software specifications, in what could be termed the "pre-initialization" of the system (which is not to be confused with the pre-initialization phase within the ASP.NET page life cycle), but also includes subsequent maintenance and upgrades to the application that has been developed using this system (invention), as such activities are typically carried out in the course of the life of the application.

Figure 3:
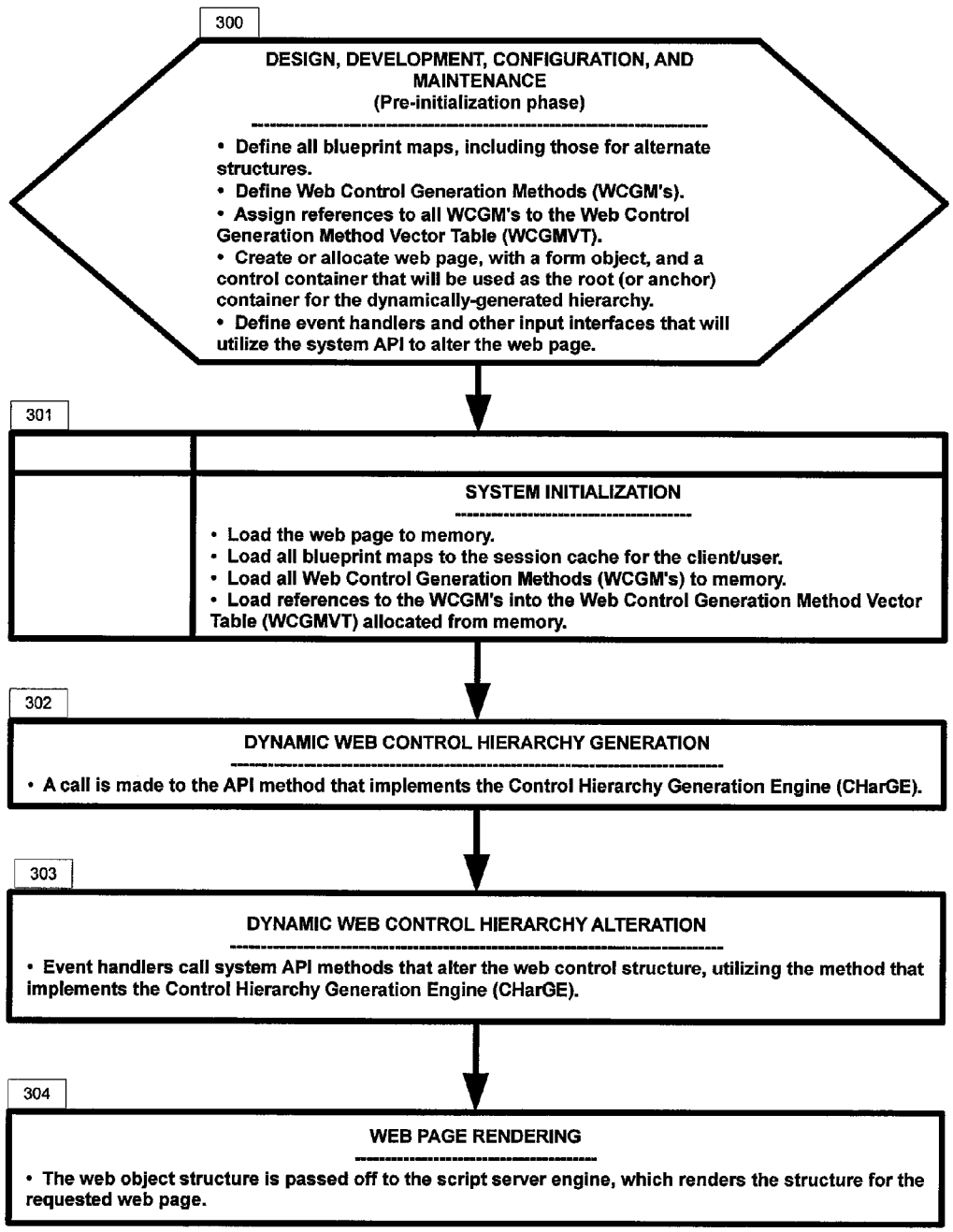
FIG. 3 illustrates the detail functional description of the present invention.

FIG. 3 illustrates a general overview of the process for configuring the Dynastrugen system, and the subsequent execution of the system. A more detailed description will be given further on within this document, utilizing FIGS. 6, 7, 8, and 9. The general aspects of this system are as follows:

- The "Pre-Initialization" phase, where the blueprint map and the web control methods are defined (also referred to as the "Design, Development, Configuration, and Maintenance" phase)
- The "System Initialization" phase, where the blueprint map and the web controls are loaded into internal memory on the scripting server, and (subsequently) the Dynastrugen system
- The "Dynamic Web Control Hierarchy Generation" phase, where the Dynastrugen system Application Program Interface method that implements the Control Hierarchy Generation Engine (CHarGE) is called to generate the web control objects
- The "Dynamic Web Control Hierarchy Alteration" phase, where the active blueprint map is modified with the insertion of sub-structures, and the substitution of alternate sub-structures with the corresponding sub-structures within the active blueprint map, usually being initiated with event handlers calling Dynastrugen system Application Program Interface methods that facilitate those processes Referring to FIG. 3 there is shown, an overview of the system. In the first part of FIG. 3 at step 300, as referenced by "Design, Development, Configuration, and Maintenance" (or "Pre-Initialization"), a developer defines any and all blueprint maps for a given web page (or set of web pages), including those for any and all alternate sub-structures that might be utilized to modify the active blueprint map in the course of the execution of the system developed with the Dynastrugen system. Generally, each web page of a website must have a form area. During execution of the system, anchoring control containers (root control containers for the dynamically-generated web control hierarchies) are placed within the form area for each web page. The developer would write software code for any and all Web Control Generation Methods (WCGM's) that would generate web control objects, which the scripting engine would render into the script for the DOM Objects required for the web page. Also, the developer would write software code to load function pointers for the Web Control Generation Methods (WCGM's) to the Web Control Generation Method Vector Table (WCGMVT). The application developer would also write software code for event handlers, which would call the Dynastrugen system API methods that would modify the blueprint map, which would, in turn, modify the structure and/or content of the web page. A more detailed description of this part will be provided further on within this document, utilizing FIG. 9.

As indicated in the system initialization part of FIG. 3 at step 301, when the web page is loaded, and the system executes, the blueprint map is loaded into session cache. Function pointers to each and every Web Control Generation Method (WCGM) are loaded to the Web Control Generation Method Vector Table (WCGMVT). A more detailed description of this part will be provided further on within this document, utilizing FIG. 6.

The Dynastrugen system API method that implements the Control Hierarchy Generation Engine (CHarGE) is called to dynamically generate the web control hierarchy (302). The CHarGE applies the Indexing Control Codes (ICC's) retrieved from the blueprint map to the Web Control Generation Method Vector Table (WCGMVT) which will generate the web control objects that will be passed to the script server for web control rendering. A more detailed description of this part will be provided further on within this document, utilizing FIG. 7.

In the event that the active web control hierarchy is to be altered (such as upon a subsequent request/response cycle in which the page is to be modified to accommodate a change in the form and nature of the data being accessed), Dynastrugen system Application Program Interface methods are called to execute the desired (and prescribed) changes at step (303). This is usually performed within an event handler. As users interact with the system, they would typically trigger the event handlers that would alter the structure and/or content of the web page. A more detailed description of this part will be provided further on within this document, utilizing FIG. 8.

The script server will subsequently utilize the dynamically-generated web control hierarchies in the generation of the web page at step (304).

Design, Development, Configuration, and Maintenance

"Pre-Initialization" Activities

Web forms are component elements within web pages. Within the web form area defined for a web page, DOM Objects are rendered into the (usually interactive) controls that implement the user interfacing necessary to access and manipulate the data requested from the server. The Dynastrugen system does not replace the basic operation of web pages, but augments the basic functionality provided by the script server upon which it executes. The primary purpose of the system (invention) is to dynamically create and (subsequently) manipulate web control hierarchies.

Figure 9:
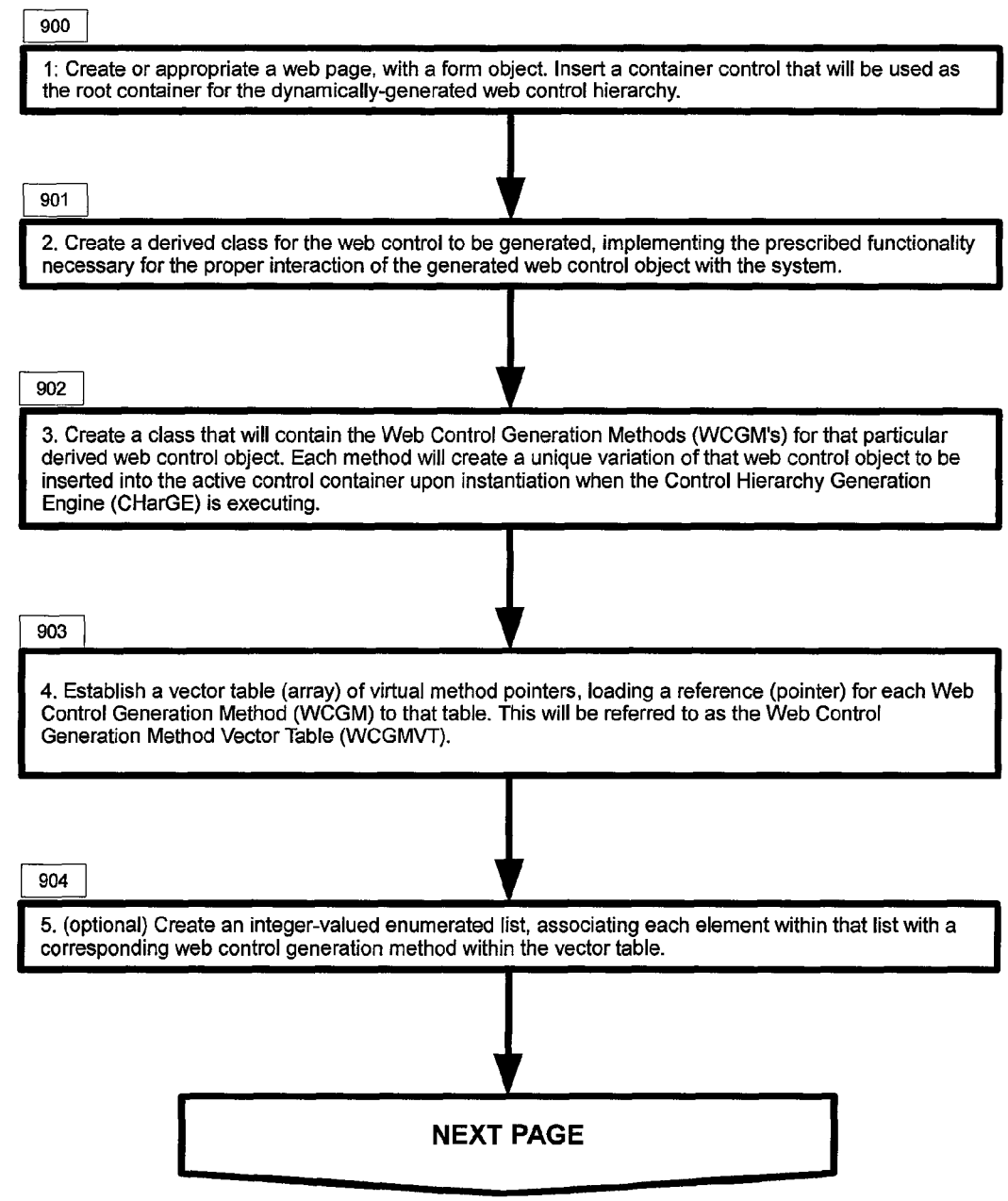
FIG. 9 is a flow chart of the detailed activities in the system.
Figure 9:
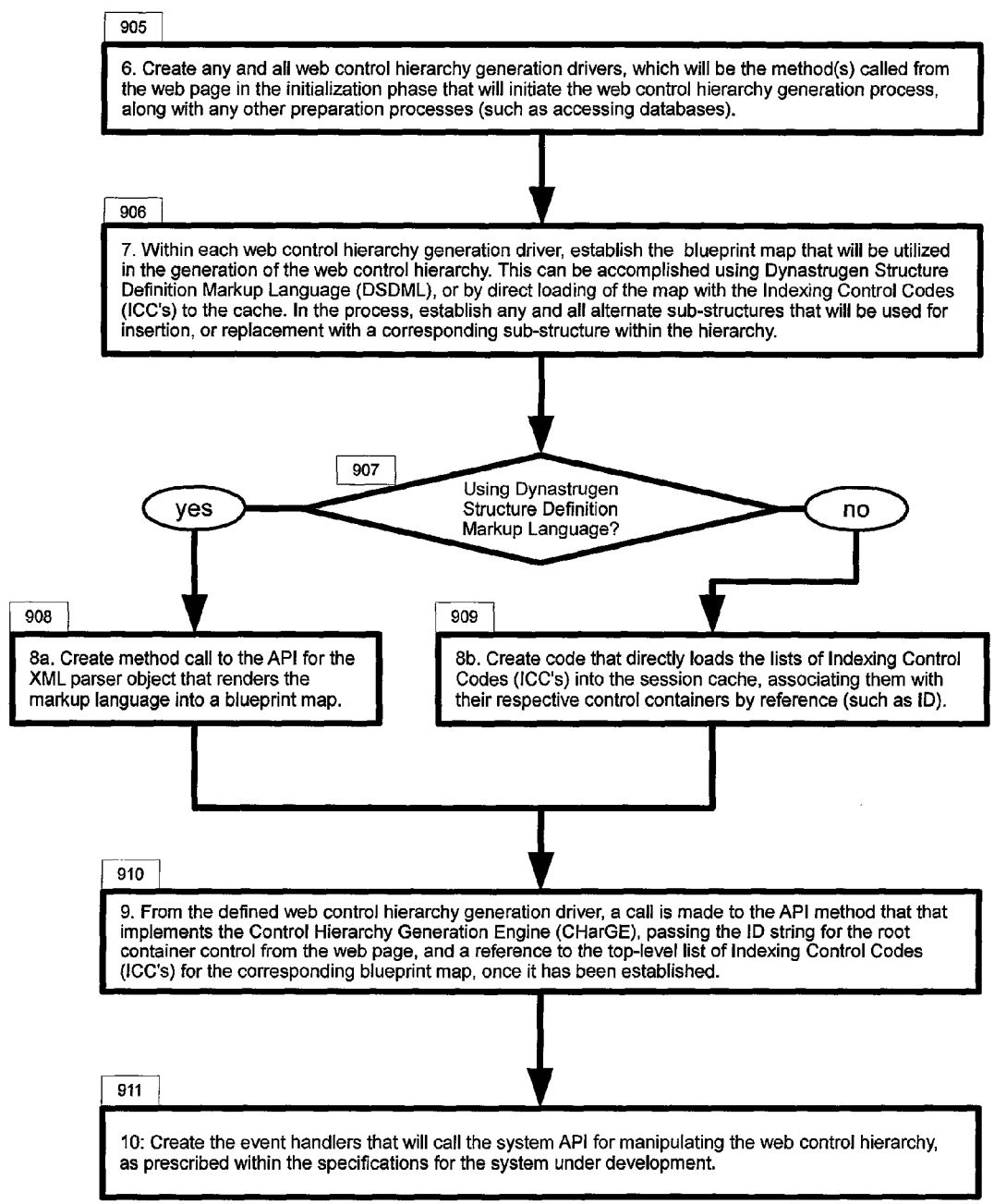

Referring to FIG. 9 there is shown. In step (900), a web page is either created or appropriated. This system requires the creation of an initial basic web form within the XHTML code of a web page, with an empty control container placed within the form, which will be used as the initial container into which the top level of the dynamic hierarchy will be inserted. That control container will be referred to as the ROOT CONTAINER within the context of this document. Alternatively, the DOM form object itself could be used as the "root" control container. Note that there is no reason why multiple root control containers cannot be present within any given form area, with multiple blueprint maps active for any given page, operating either sequentially or concurrently.

In step (901), the application developer utilizing the Dynastrugen system defines or identifies (as it may already be defined within the system) every web control object that will be required to develop the application, implementing the prescribed functionality necessary for the proper interaction of the generated web control object within the context of the system.

In step (902), for each variation of those web control objects, the developer creates a Web Control Generation Method (WCGM) to initialize the instantiated web control object.

Figure 5:
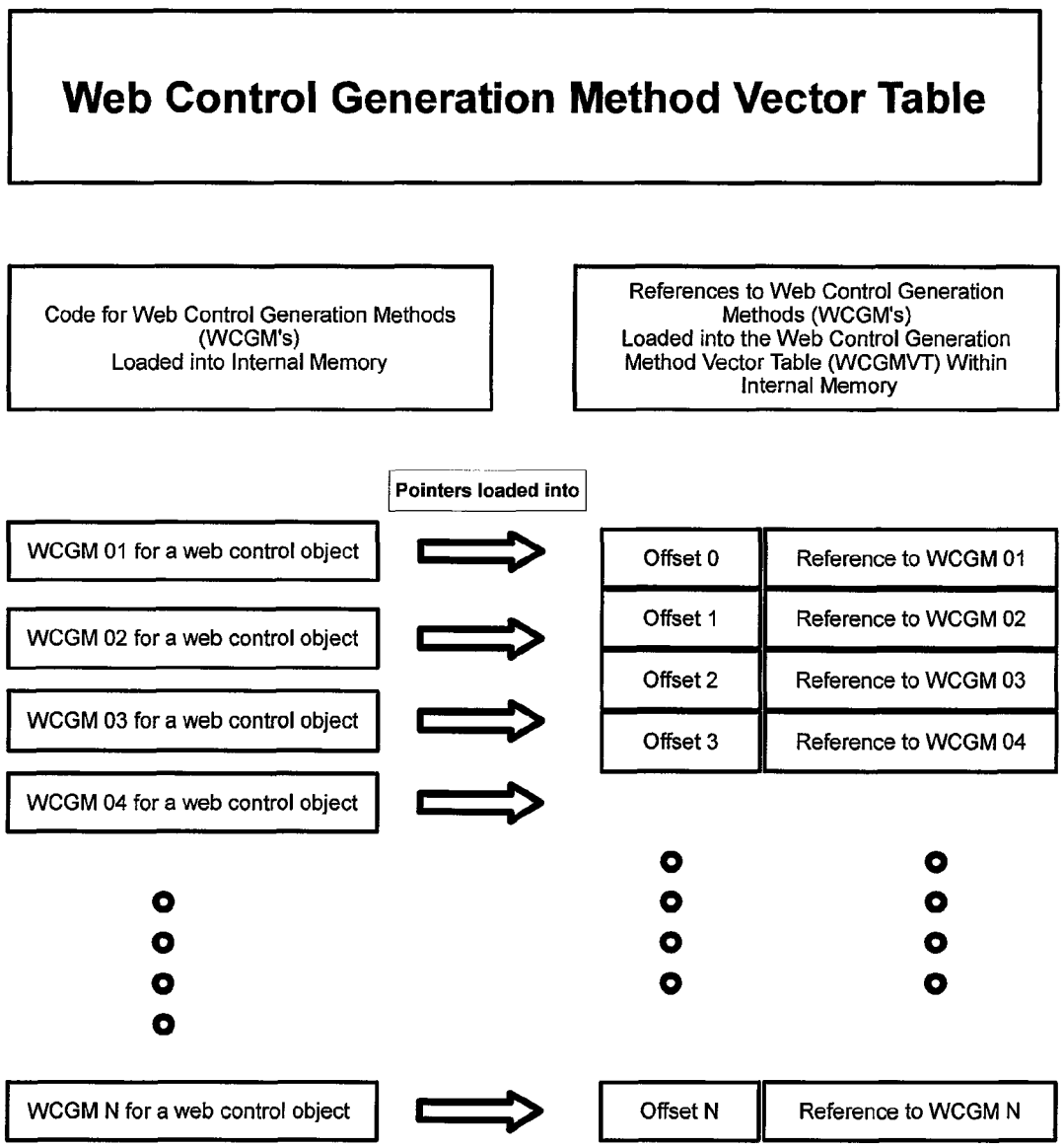
FIG. 5 depicts an example of the web control generation method vector table.

In step 4 (903), each Web Control Generation Method (WCGM) is associated with a unique integer-valued Indexing Control Code (ICC). The function pointer within the Web Control Generation Method Vector Table (WCGMVT) located at the position referenced by that ICC is utilized to reference and call that method. The function pointer references the method within computer memory. The developer writes the software code that will load those function pointers (for each of the WCGM's) into the WCGMVT. In practice, it would be advisable to utilize enumerated lists of symbolic constants to assign and reference the ICC's, as noted in step 5 in FIG. 9 (904). Please refer to FIG. 5 for a representation of that structure.

In step (905), the developer also defines any and all web control hierarchy generation driver method(s) that will be required to initialize the system. The driver method would be called during the initialization event for the web page, and would typically be a method within the control object instantiated during that event. Tasks performed within the driver method would include the loading of any data from whatever databases that might be accessed into whatever structures that will be utilized to access (and perhaps modify) that data. It also includes the necessary software code to load the blueprint map (as will be mentioned in the next paragraph). One other task that should be performed would be to write the software code to call the API method that generates the structure of web control objects utilizing the Indexing Control Codes (ICC's) within a blueprint map. That API method is the CHarGE.

Figure 4:
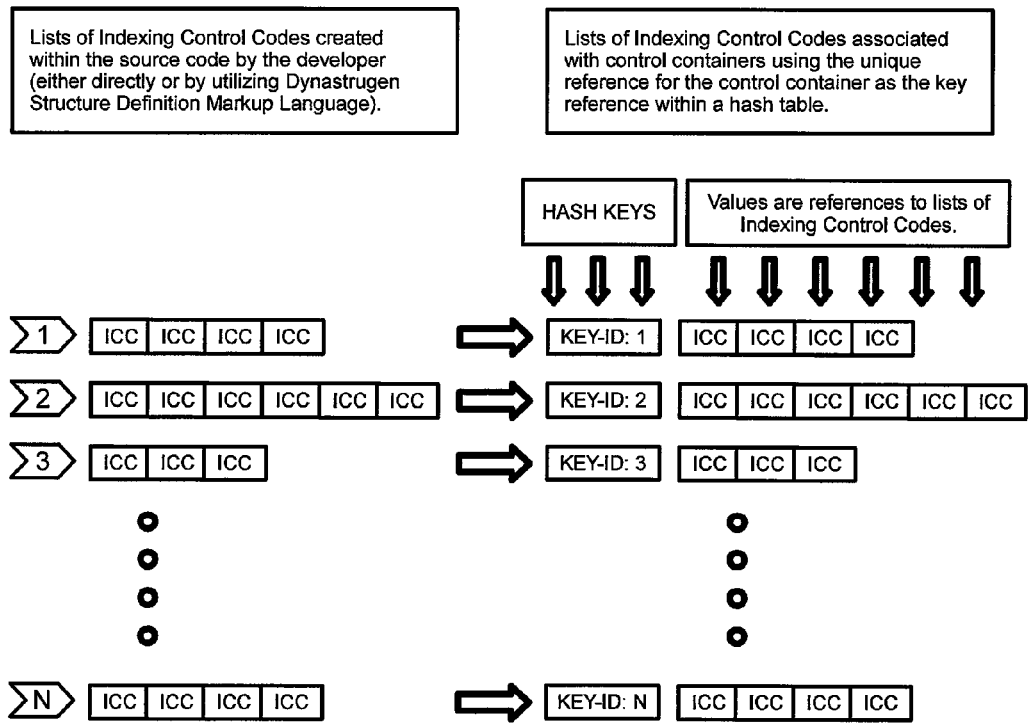
FIG. 4 depicts the composition of an example of the blueprint map.

In step (906), the developer defines the blueprint map(s). The process of blueprint map creation would typically be initiated within the developer-defined web control hierarchy generation driver. It is at this stage that Indexing Control Codes (ICC's) are loaded into lists in the order that the corresponding web control objects are to be loaded to the control container that the list is intended for. In one embodiment of the present invention, the lists can be loaded into a hash table data structure, as established within the session cache, utilizing the ID string for the control container as the key, with a reference (pointer) to the corresponding list of ICC's intended for that control container as the value. Please refer to FIG. 10 for a representation of an example with the control containers configured in a hierarchy, with container controls, and non-container controls (textboxes, listboxes, labels, buttons, and the like), within those control containers, as they would be rendered for a particular blueprint map. In another embodiment of the invention, the lists can also be loaded into an integer-indexed list of ICC lists, creating a jagged, two-dimensional array, as each integer value would be uniquely associated with a particular control container. Please refer to FIG. 4 for an example representation of a blueprint map.

At step 907, if Dynastrugen Structure Definition Markup Language (DSDML) is being utilized to define and create any blueprint maps, then the system proceeds to FIG. 8a at step (908). From the developer-defined web control hierarchy generation driver, a call would be made to the Application Program Interface (API) method that implements the XML parser integral to the Dynastrugen system to load and process DSDML, which can generate blueprint maps automatically. With that option, the developer can write software code to interface with the XML parser, utilizing the API intended for that purpose, passing as parameters the name of the XML file in which the structure (or sub-structure) resides, along with the name of the structure (or sub-structure) within that file to be loaded, and the ID string for the control container into which the top level of the web control hierarchy is to be generated.

At step 907, alternatively, if Dynastrugen Structure Definition Markup Language (DSDML) is not being utilized to define and create blueprint maps, then the system proceeds to FIG. 8b at step (909) would be taken. This would involve the creation of (a) blueprint map(s) where the developer would write software code to create the sequence(s) of Indexing Control Codes (ICC's) within the lists intended for the control container(s), then load the lists to the table within the session cache directly.

Once the blueprint map has been loaded into the table established within the session cache, it is not necessary to reload it on every subsequent request/response cycle, so logic should be introduced within the web control hierarchy generation driver method that will prevent that from happening.

In step (910), from the developer-defined web control hierarchy generation driver, a call is made to the API method that that implements the Control Hierarchy Generation Engine (CHarGE), passing the ID string for the root container control from the web page, and a reference to the top-level list of control codes for the blueprint map, once it has been established. In one embodiment of the present invention, the CHarGE will retrieve the lists of ICC's from the blueprint map, using the ID string for the control container, and utilize the ICC's within those lists to reference the function pointers within the Web Control Generation Method Vector Table (WCGMVT) to call the associated Web Control Generation Methods (WCGM's) that will instantiate the web control objects intended for the control container.

In step 10 (911), the developer writes software code that implements event handlers that will call the Application Program Interface methods (API), which will alter the structure of the given blueprint map, which, in turn, will alter the structure and content of the web page. It is with those API methods that sub-structures can be inserted into the primary (active) blueprint map, and alternate sub-structures can be interchanged with sub-structures within the primary (active) blueprint map.

The Flow of System Execution

Figure 6:
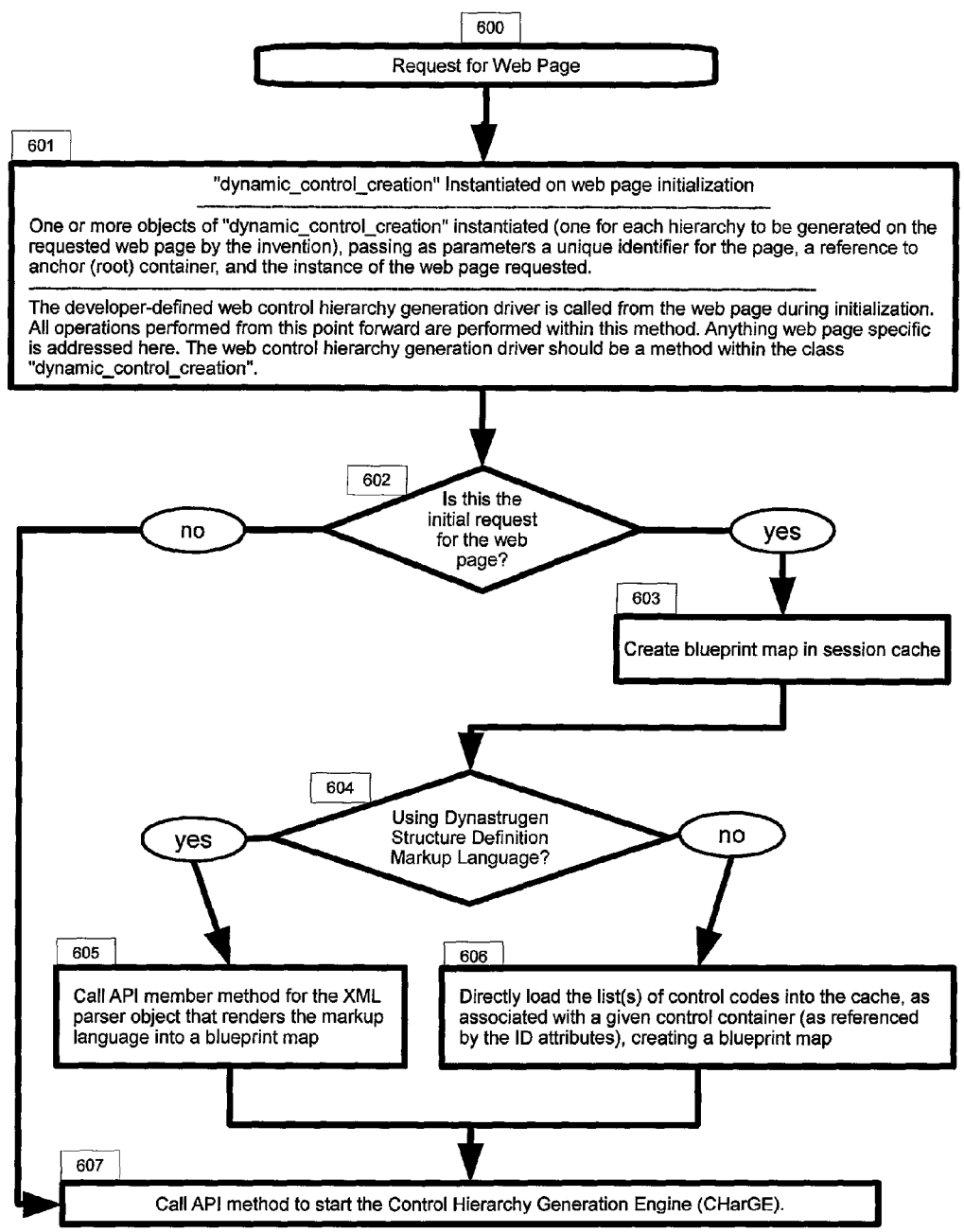
FIG. 6 illustrates a request after the detailed request for an initial web page
Figure 7:
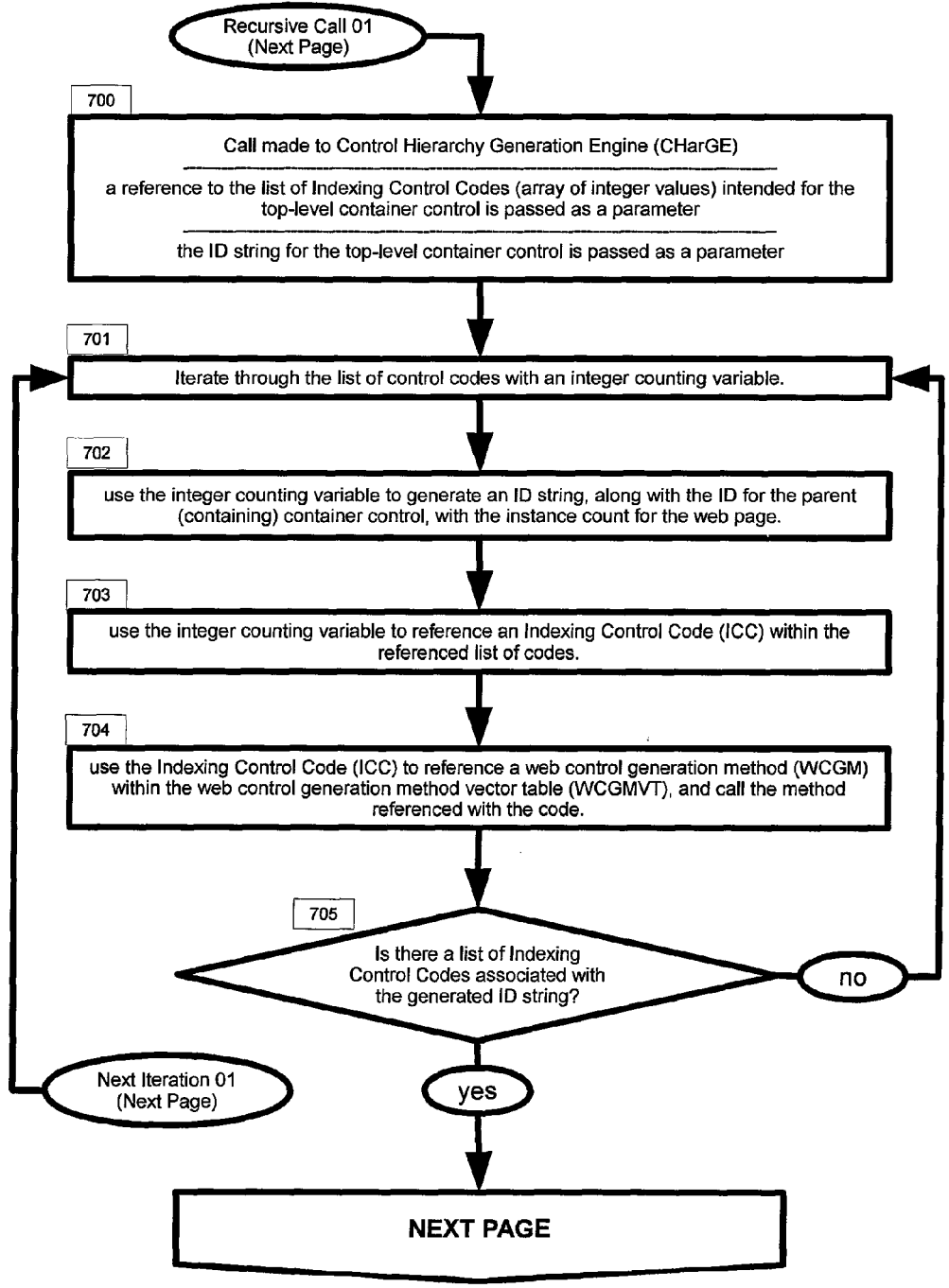
FIG. 7 illustrates a detailed flow charge of recursion process.
Figure 7:
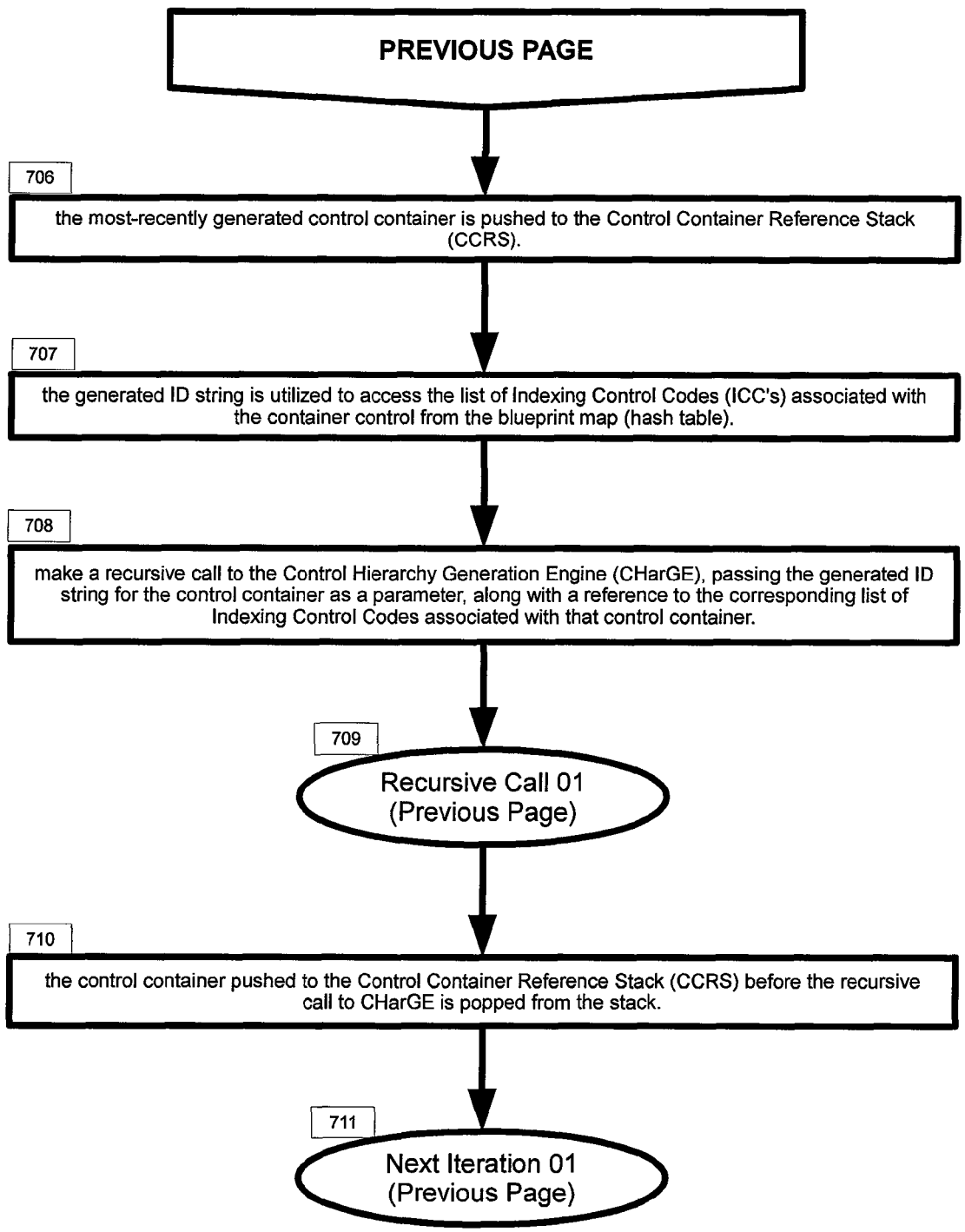

The Dynastrugen system has the following execution phases, as shown in FIGS. 6, 7 and 8:
System initialization, where the blueprint map, consisting of lists of Indexing Control Codes (ICC's) loaded into a table data structure within the session cache (usually not necessary after the initial request), and the Web Control Generation Methods (WCGM's) are loaded into the Web Control Generation Method Vector Table (WCG-MVT) (which is not necessary after the initial web page request if the WCGMVT is static).
Web control hierarchy generation, where the API method that implements the Control Hierarchy Generation Engine (CHarGE) is called to dynamically generate the web control hierarchy, based upon the ICC's within a blueprint map.
Web control hierarchy alteration, where the blueprint map (and the web page itself) is changed by utilizing the Application Program Interface methods (API) intended for those operations, which can be called from event handlers, or by reacting to other sources of system inputs.

System Initialization

During initialization, the system loads the software for each developer-defined Web Control Generation Method (WCGM) into computer memory. The software code that loads the pointers that reference those methods into the Web Control Generation Method Vector Table is executed. Once that code has been executed, the WCGMVT will contain a list of function pointers, wherein each pointer will uniquely reference a WCGM within computer memory. In one embodiment of the current invention, each Indexing Control Code (ICC) retrieved from the blueprint map will be utilized as an indirect reference for the WCGM to be called, as it would be utilized by the CHarGE during the generation phase. In this sense, the WCGMVT is utilized as a set of translative references to those WCGM's. Please refer to FIG. 5 for a representation of that structure.

In one embodiment of the current invention, the collection of lists of Indexing Control Codes (ICC's) that comprise a blueprint map is loaded into a hash table data structure in session state, indexed by the unique identifying attribute of the control container for which the web control objects to be generated utilizing those ICC's are intended. The hash table is a plurality of array list objects, with each array list accessed by a key-value pair. Thus, each developer-defined sequence of ICC's are loaded into an array list object. The sequence of ICC's are segmented into collections of objects to be rendered on the client machine, with each segment being associated with a particular control container. A key-value pair is defined for each collection of ICC's to be utilized to generate and insert the web control object to be rendered by the scripting server. A reference to each collection is inserted to the table, with an identity element for the control container being utilized as the key for insertion. Usually that identity element is the ID string for the container, but it can be a unique integer identifier. Please refer to FIG. 4 for a representation of that structure.

Session state represents the interface connection between the client and the server. It contains the data object structures necessary to sustain the connection between the client and server during execution of the web application over the internet. Session state information is stored in a cache, which can be a hash table, but can be described more generally as a matrix, or a collection of lists. Included within that collection are the lists that comprise the collection of Indexing Control Codes (ICC's) to be rendered.

In one embodiment of the present invention, the keys for the key-value pairs inserted into the hash table is defined by an ID string representing the control container. An association is created between the control container and the list of Indexing Control Codes (ICC's) that is used to generate the web controls intended for that container. For each web control object instantiated, an ID string is created as a composite consisting of the ID string for the control container containing the web control object, with a string representation of the ordinal indexing value for the related ICC within the list, and a separator character to insure uniqueness. Also included within the ID string composite is the instance count for the web page, as the user/client can open more than one instance of a given web page at any given time. As a control container is a web control object, then control containers are assigned unique ID strings in the same manner as any other web control object. A sample representation for the structure can be found in FIG. 10.

FIG. 6 is a flow chart of the initialization process of the present invention. At step (600), a request for a web page comes in to the server from a client.

At step (601), one or more system control object(s) is/are instantiated. One system control object is generally instantiated for each web control hierarchy to be generated. Then, a unique identifier for the page, a reference to an anchor (root) container control, and the instance count of the requested web page are passed as parameters to the system control object. The web control hierarchy generation driver should be a method within the class that defines a system control object. Then, any and all user-defined web control hierarchy generation driver method(s) are called, and all application-specific requirements are resolved therein.

If the request is the initial page request at step (602), then the system proceeds to step 603 to load the blueprint map into the session cache associated with the user session, as initiated with the client machine (as shown in FIG. 2). If the request for the web page is NOT the initial request, then the system should proceed to utilize an active (previously-loaded) blueprint map.

At step 604, if the blueprint map is being created and loaded utilizing Dynastrugen Structure Definition Markup Language (DSDML), then the system proceeds to step 605 wherein an object for the XML loader class is instantiated from within the developer-defined web control hierarchy generation driver method. With this object, a call is made to the API to load the structure defined within an XML file. Both the name of the file and the structure within that file are passed as parameters to the API method.

At step 604, alternatively, if DSDML is not being utilized, then the system proceeds to step 606 wherein the lists of Indexing Control Codes (ICC's) are loaded to the table structure within session cache directly from within the developer-defined web control hierarchy generation driver method. As each sequence of ICC's associated with a control container is loaded to a list, then the list is inserted into the table structure, utilizing a unique identifying attribute for the control container as the key. In one embodiment of the present invention, the unique identifying reference is the ID field.

At step 607, the API method that implements the Control Hierarchy Generation Engine (CHarGE) is called from the developer-defined web control hierarchy generation driver method. The ID string for the anchor (root) container control is passed as a parameter to the CHarGE, along with the list of Indexing Control Codes (ICC's) associated with that container control. The operations performed by the CHarGE will be described within the next section.

Web Control Hierarchy Generation

In this system (invention), whenever a client requests a web page from a particular web application located on a server, the Dynastrugen system intercepts the request during the early phases of the page load process, and commences the initialization process defined above. Upon completion of that process, the generation of the web control hierarchy can then be initiated. From the web control hierarchy generation driver method (as written by the developer), a call is made to the Application Program Interface method (API) that implements the Control Hierarchy Generation Engine (the CHarGE). The CHarGE utilizes the Indexing Control Codes (ICC's) retrieved from the active blueprint map to reference and call the Web Control Generation Methods (WCGM's) that instantiate the web control objects intended for the control containers that will be created within the web control hierarchy. Upon completion of the generation process, the web control hierarchy is then rendered into the web controls intended for the web page by the script processing engine.

Each Indexing Control Code (ICC) is associated with a Web Control Generation Method (WCGM). Each list of ICC's are associated with a particular control container. As the Control Hierarchy Generation Engine (the CHarGE) iterates through each list of ICC's, it utilizes each ICC in sequence as an indexing value within the Web Control Generation Method Vector Table (WCGMVT) to reference and call the WCGM associated with that particular ICC. The WCGM called will instantiate the web control object that it is intended for, and initialize it in whatever way that it needs to be initialized in order to perform in whatever role it is intended for, and perform any other operations that are required, as defined within the specifications for the application(s) being developed.

In the process of iterating through the list of ICC's, the ID string is created for the web control object being instantiated. The ID string is a composite, consisting of the ID string for the containing (parent) control container, with a string representation of the ordinal indexing value of the related ICC within the list, and a separator character to insure uniqueness. In addition, a string representation of the instance count for the web page is also included as a part of the composite.

As each ICC is processed, and each ID string is composed, the unique identifier associated with the instantiated web control object is checked to determine if there is a list of ICC's associated with it. If one is found, and the most-recent web control object instantiated is a control container, then a reference to that control container is pushed to the stack of control container object references, as maintained by the CONTROL CONTAINER REFERENCE STACK FACILITATOR (CCRSF), and a recursive call is made to the CHarGE. Processing of the list associated with that control container then commences, until the end is reached, and control then passes back to the point of the recursive call to the CHarGE. At that point, the reference that had been pushed to the stack of control container object references (as maintained by the CCRSF) is then popped, and processing of the superior-level ICC's then resumes where it had left off prior to making the recursive call.

A flow chart of the Control Hierarchy Generation Engine (CHarGE) API method is shown in FIG. 7. In step (700), upon calling the CHarGE, a reference to a list of Indexing Control Codes (ICC's) is passed as a parameter, along with the ID string related to the control container that the list of ICC's is intended for.

In step 2 (701), the CHarGE initializes an integer counting variable, and utilizes it to iterate through the active list of ICC's (associated with the control container that is currently on top of the Control Container Reference Stack), a reference to which is passed as a parameter to the API method.

In step (702), a composite ID string is formed, using the ID string of the containing (parent) container control, along with a string valued representation of the iterating value, a separator character (to insure uniqueness), and a string representation of the web page instance count.

In step (703), the iterating value is utilized to reference a specific Indexing Control Code (ICC) within the list.

In step (704), the ICC is utilized to reference a Web Control Generation Method (WCGM) within the Web Control Generation Method Vector Table (WCGMVT), and call the method utilizing the virtual function pointer within that element position. As each web control object is instantiated, it loads itself into the control container of the container control that is being referenced by the top element of the container control reference stack.

In step (705), a check is performed to determine if there is any Indexing Control Code (ICC) lists associated with the Web Control Generation Method being called.

In step 7 of FIG. 7 (706), in one embodiment of the current invention. At step 707, if there is a list of ICC's associated with the web control object instantiated, and the web control object is a control container, then a reference to that object is pushed to the container control reference stack, as maintained by the CONTROL CONTAINER REFERENCE STACK FACILITATOR, and the composite ID string for the container control is utilized to retrieve a reference to the list of ICC's from the blueprint map.

In step (708), the list of ICC's, and the composite ID string are passed as parameters in a recursive call to the API method (the CHarGE) to continue processing on that lower level (709).

On return from the recursive call, in step (710), the reference for the control container that is at the top of the container control reference stack is popped off of the stack, and processing then continues on that same level, until the last Indexing Control Code (ICC) has been utilized.

At step 711, the engine repetitively retrieves each list of Indexing Control Codes (ICC's) from the table in the session cache, starting with the initial root container list of ICC's. For each ICC within a list, the system checks for a list of ICC's in the table associated with the web control object most recently instantiated. If an associated list is found, and the web control object is a control container, then the system pushes a reference to that control container onto the Control Container Reference Stack, and the CHarGE recursively calls itself to process the list of ICC's at the next (lower) level. The system continues to recursively call itself until the entire hierarchy of web control objects referenced within the table created in session state (blueprint map) associated with a specific web page being rendered has been traversed. Once the entire web control hierarchy has been generated, it is passed to the scripting server for rendering.

Web Control Hierarchy Alteration

After the blueprint map is initially loaded, as referenced in 603 of FIG. 6, the structure can be altered utilizing Dynastrugen system Application Program Interface methods (API), which, in turn, can alter the structure of the web control hierarchy. The process for implementing this type of dynamic functionality involves the usage of alternate sub-structures, which can be used to either switch sub-structures (alternate sub-structures swapped with corresponding sub-structures that are within the active blueprint map), or to insert sub-structures. This process is often initiated utilizing event handlers initiated by user interaction with web controls at the client machine, as it has interfaced with the server via the internet, but can be initiated by any handler on virtually any input to the system.

Dynastrugen Structure Definition Mark-up Language (DS-DML) has provisions for establishing alternate sub-structure definitions, including the ability to assign ID prefixes, utilizing the tag attribute intended for that purpose, along with another tag attribute that is used to establish group associations for each set of associated alternate sub-structures that are intended to be swapped with each other.

Flow charts for the methods utilized to alter the configuration of the blueprint map, as well as the web control hierarchy for the web page that the map is applied to, is shown in FIGS. 8a and 8b.

Referring to FIG. 8a, in step (800), sub-structures can be inserted into the primary (active) structure utilizing a system API method, which moves the web control sub-structure at the insertion point to a point given with a passed parameter to the API method, along with the portion of the blueprint map associated with that (moved) sub-structure. When a sub-structure is inserted to an active blueprint map, the API method is called, passing a reference to the root container into which the web control objects that will be generated using the Indexing Control Code (ICC) list associated with the root container control for the sub-structure, along with a reference to the container control into which the displaced sub-structure will be shifted to, and the ID string for that (what would then be) root sub-structure container control. There is an API method that will perform that shifting operation. The API methods are typically called from an event handler, such as a click handler for a button control.

In step (801), from the same handler method, a call is made to the API method that implements the Control Hierarchy Generation Engine (the CHarGE), which is utilized to generate the web controls associated with the inserted blueprint map sub-structure.

Referring to FIG. 8b, in step 1 (802), sub-structures can be swapped out for alternate sub-structures by calling system API methods that can either swap the sub-structure with the alternate sub-structure (if there is only one alternate sub-structure), or by overwriting the primary (active) sub-structure with the alternate sub-structure referenced with the prefix string (there can be more than one). The mechanism that implements the swapping operation utilizes a prefix string, which is prepended to the ID string for the container control that is the root container control for the sub-structure that is to be swapped with the alternate set. That prefixed ID string, along with the list of Indexing Control Codes (ICC's), should have been loaded to the table established within the session cache during the System Initialization phase, or by the handler that is driving the swapping operation. In the course of a swapping operation, that prefix string is passed as a parameter, along with the ID string for the root container control of the sub-structure that is to be swapped, to an API method, usually called from within an event handler. The swapping operation can be performed using either a direct switch (the alternate sub-structure switching positions with the corresponding sub-structure within the active blueprint map), or with a destructive over-write. There are API methods for performing each operation.

In step (803), from the same event handler, a call is made to the API method that implements the Control Hierarchy Generation Engine (the CHarGE), which is utilized to generate the web controls associated with the alternate sub-structure that has been switched into the primary (active) structure.

Figure 10:
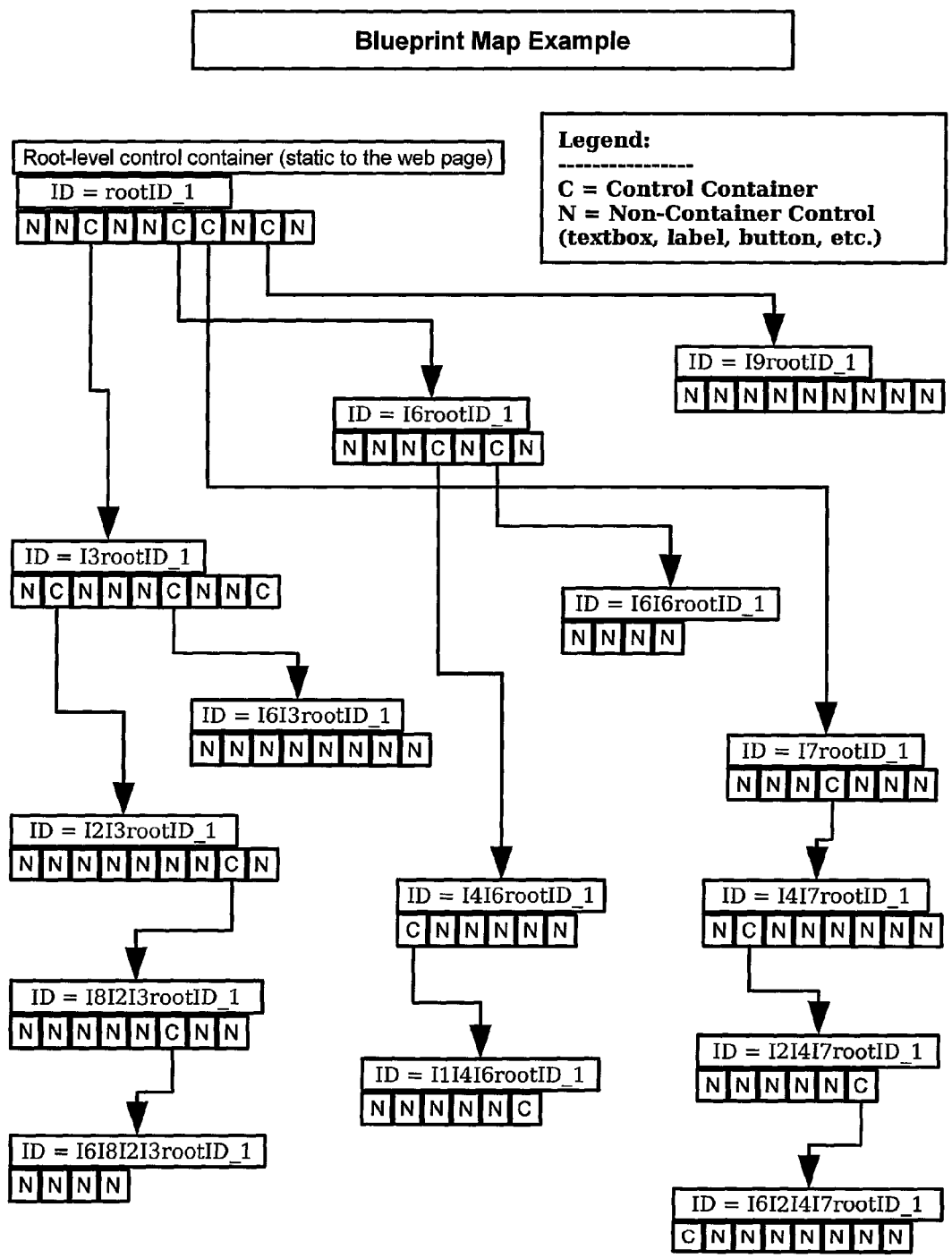
FIG. 10 is an example of the blue print map

An example representation of a blueprint map can be found in FIG. 10. Note that, within the structure given, some of the cells contain Indexing Control Codes (ICC's) for control containers which have no child lists associated with them. This is not an oversight, but would be necessary should there be any insertion operations that would need to be performed upon the active blueprint map (and the generated hierarchy) in the course of the operation of the system developed with Dynastrugen.

Figure 11:
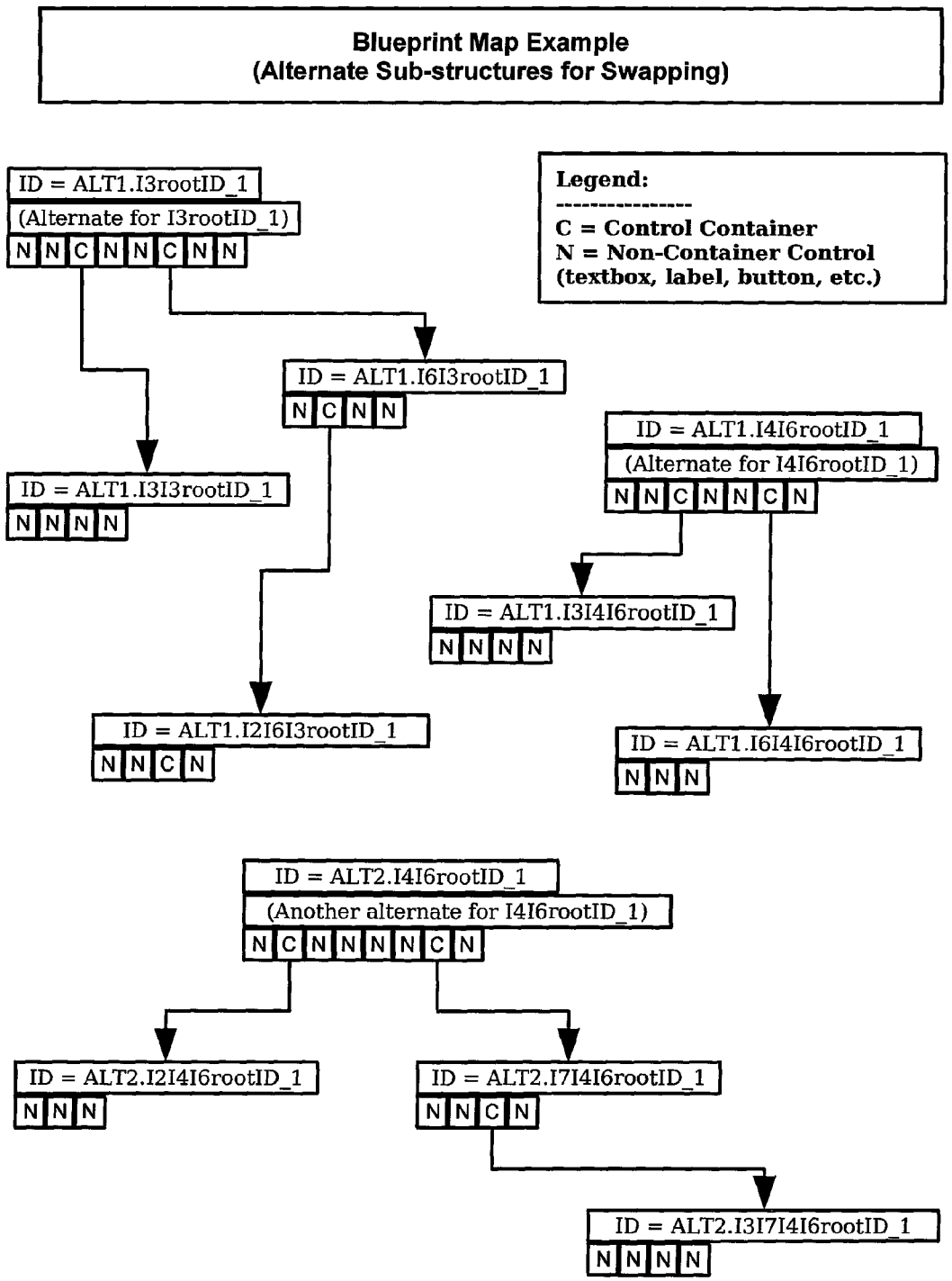
FIG. 11 illustrates an example of blue print map alternate sub-structures

Example representations of blueprint maps for alternate sub-structures can be found in FIG. 11. There is one alternate sub-structure for the control container with the ID of I3rootID (within the blueprint map described within FIG. 10), and two alternate sub-structures for the control container with the ID of I4I6rootID.

Figure 12:
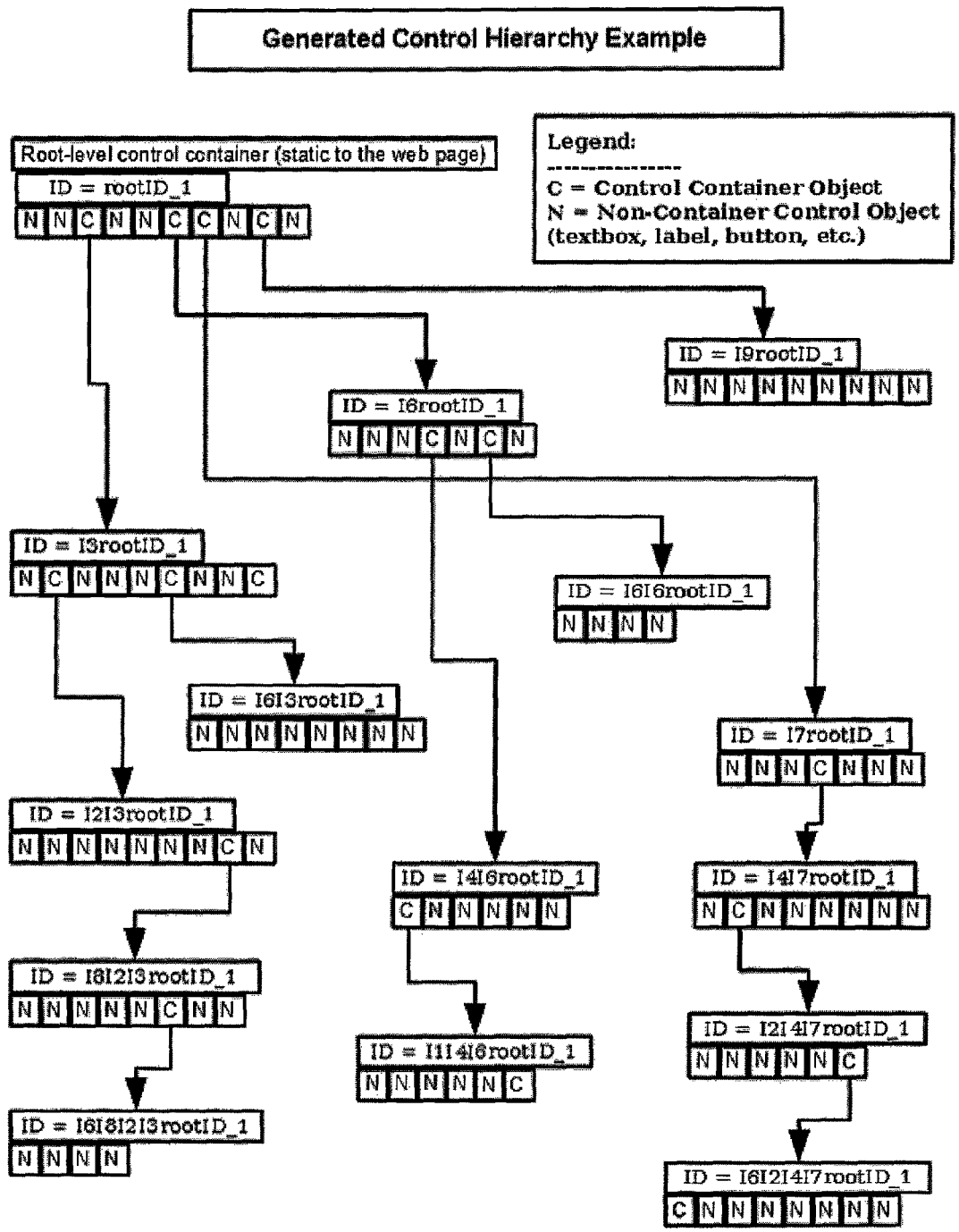
FIG. 12 illustrates an example of a generated control hierarchy

FIG. 12 shows an example of the output generated by the system. The output comprises the actual web control objects that will be sent to the scripting engine for output into DOM language prior to transmission to the client.

What is claimed is:

1. A method of generating a dynamic user interface in a client/server computer networked environment, the method comprising:
    storing a list of developer-defined web control methods in a table in storage on the server;
    for each web page of the user-interface, storing a developer-defined blueprint map comprising a plurality of lists of index control codes which correspond to a particular web control generation method at the server;
    at the server, receiving from the client a request to access a website;
    upon receipt of the request to access the website, the server performs the following:
    generating a session object to be stored in cache memory that represents a communications path between the client and server;
    loading the web control generation methods into memory;
    loading the blue print map into the cache memory associated with the website;
    for each initial page requested associated with the website by the client repeat the following:
        associating a root container with a form object in the cache memory;
        pushing the root container on an operational stack which contains an address of each control container object at the point of instantiation;
        accessing a list of index control codes from the blue print map associated with the root container;
        for each index control code associated with a control container or the root container recursively do the following;
        if the index control code corresponds to a web control generation method, instantiating a web control object associated with the web generation control method and storing within the control container a reference to the web control object;
        if the index control code corresponds to a control container then, pushing the control container on the operational stack wherein the control container becomes the currently active control container;
        retrieving a new list of index control codes from the blue print map that corresponds to the control container;
        processing each index control code for each currently active control container until each index control code associated with the root container is processed;
    generating a hierarchy of web control objects associated with the web page being rendered; and
    transmitting the hierarchy of web control objects to the client.

2. The method of claim 1 wherein loading the web control methods into memory further comprises:
    for each web control generation method generate a function pointer;
    load each function pointer in a vector table wherein each index in the vector table becomes an index control pointing to address of the web control in memory.

3. The method of claim 1 wherein loading the blue print map further comprises:
    generating a plurality of lists of index control codes wherein each index control point to corresponding developer-defined web control method;
    and loading each list of index control codes into memory.

4. The method of claim 1 further comprising storing an alternate developer-defined sub-structure blueprint map comprising a plurality of lists of index control codes which correspond to a particular web control method in storage at the server.

5. The method of claim 4 wherein upon a system event loading the alternate sub-structure blue print map into cache memory overriding the current blueprint map structure.

6. The method of claim 4 wherein upon a system event inserting the alternate sub-structure blue print map into cache memory into the current blueprint map structure.

7. A system of generating a dynamic user interface in a client/server computer networked environment, the system comprising:
    the processor of the server program to:
    store a list of developer-defined web control methods in a table in storage on the server;
    for each web page of the user-interface, store a developer-defined blueprint map comprising a plurality of lists of index controls which correspond to a particular web control method in storage at the server;
    at the server, receive from the client a request to access a website;
    upon receipt of the request to access the website by the server perform the following:
    generate a session object to be stored in cache memory representing the communications link between the client and server;
    load the web control methods into memory;
    load the blue print map into memory;
    for each new page requested by the client repeat the following:
        create a form object within the session object located in the cache memory;
        associate a root container with the form object;
        associating the root control container as a current control container on an operational stack;
        load a list of index controls from the blue print map into the current control container;
        for each index control in the list,
        if the index control corresponds to a web control, generate a corresponding web control method object and associate the corresponding web control object with a dynamic web control hierarchy;
        if the index control corresponds to a new control container then,
            save the current control container on the operational stack;
            retrieve a new list of index controls from the blue print map that corresponds to the new control container;
        associate the new control container and the new list of controls as the current control container and the current list of index controls;

upon processing a final from the current list of index controls of the current control container, retrieve if it exists, from the top of the operational a new current control container;

if the operational stack is not empty, continue to process the list of index controls of the new current control container;

if operational stack is empty, generate the dynamic control hierarchy;

transmit the dynamic control hierarchy to the client.

8. The system of claim 7 wherein the processor at the server is programmed to:

for each web control generation method generate a function pointer;

load each function pointer in a vector table wherein each index in the vector table becomes an index control code pointing to address of the web control in memory.

9. The system of claim 7 wherein the processor at the server is further program to:

generate a plurality of lists of index control codes wherein each index control code point to a corresponding developer-defined web control generation method; and load each list of index control codes into memory.

10. The system of claim 7 wherein the processor at the server is further programmed to store an alternate developer-defined sub-structure blueprint map comprising a plurality of lists of index control codes which correspond to a particular web control method in storage at the server.

11. The system of claim 10 wherein the processor at the server is further programmed upon a system event from the client, load the alternate sub-structure blue print map into cache memory overriding the current blueprint map structure.

12. The system of claim 10 wherein the processor at the server is further programmed upon a system event from the client, insert the alternate sub-structure blue print map into cache memory into the current blueprint map structure.

* * * * *